Dec. 26, 1961 R. L. LICH 3,014,735
TANDEM AXLE MOUNTING FOR VEHICLES
Filed Feb. 18, 1957 4 Sheets-Sheet 1

INVENTOR
RICHARD L. LICH
BY: Rodney Bedell
ATTORNEY

Dec. 26, 1961  R. L. LICH  3,014,735
TANDEM AXLE MOUNTING FOR VEHICLES
Filed Feb. 18, 1957  4 Sheets-Sheet 2

INVENTOR
RICHARD L. LICH
BY: Rodney Bedell
ATTORNEY

Dec. 26, 1961  R. L. LICH  3,014,735
TANDEM AXLE MOUNTING FOR VEHICLES
Filed Feb. 18, 1957  4 Sheets-Sheet 3

INVENTOR
RICHARD L. LICH
BY: *Rodney Bedell*
ATTORNEY

United States Patent Office 3,014,735
Patented Dec. 26, 1961

3,014,735
TANDEM AXLE MOUNTING FOR VEHICLES
Richard L. Lich, St. Louis, Mo., assignor to General Steel Industries, Inc., a corporation of Delaware
Filed Feb. 18, 1957, Ser. No. 640,663
9 Claims. (Cl. 280—104.5)

The invention relates to running gear for a vehicle particularly adapted for highway trailers, although including features which could be used on other types of vehicles.

The invention comprises so-called tandem axle assemblies with a common spring support for the vehicle body.

One object of the invention is to equalize the spring-supported load to both of the axles.

Another object is to incorporate an air spring mounting in an equalizing tandem axle assembly.

Another object is to effect a degree of lateral stability.

Another object is to obtain the above mentioned advantages without undue increase of weight.

These and other objectives are attained by the structure illustrated in the accompanying drawings, in which.

The structure illustrated in FIGURES 1–4 includes a spring plank extending between equalizers at opposite sides of the vehicle.

Figure 1:
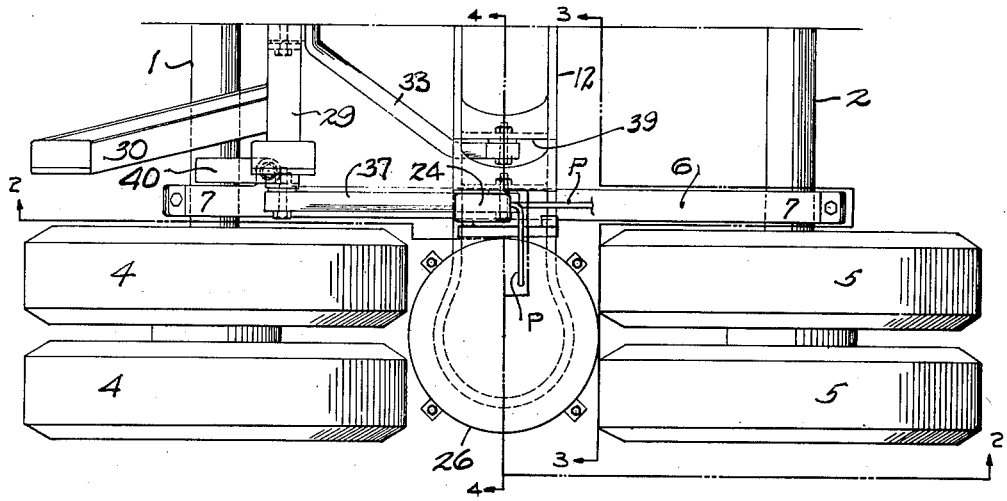
FIGURE 1 is a top view of one longitudinal half of a tandem axle and wheel assembly.
Figure 2:
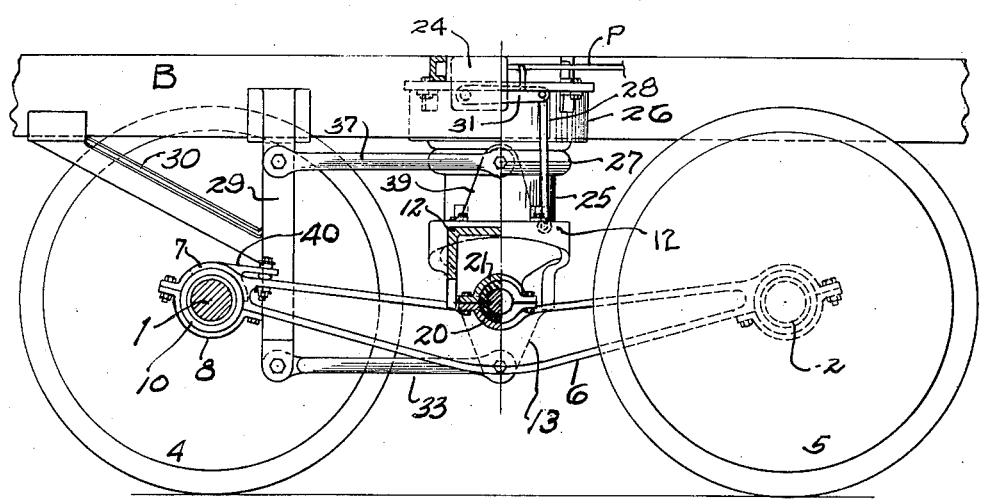
FIGURE 2 is in part a side elevation and in part a longitudinal vertical section on the line 2—2 of FIGURE 1, and showing a portion of the vehicle frame mounted on the tandem axle assembly.
Figure 3:
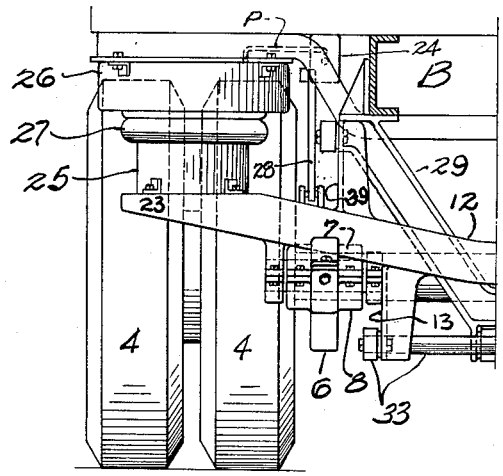
FIGURE 3 is a transverse vertical section on the line 3—3 of FIGURE 1, showing a portion of the vehicle frame.
Figure 4:
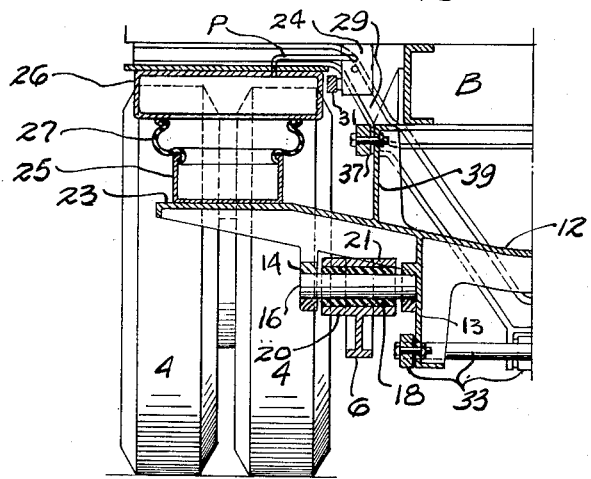
FIGURE 4 is a vertical transverse section on line 4—4 of FIGURE 1, and showing a portion of the vehicle frame.
Figure 5:
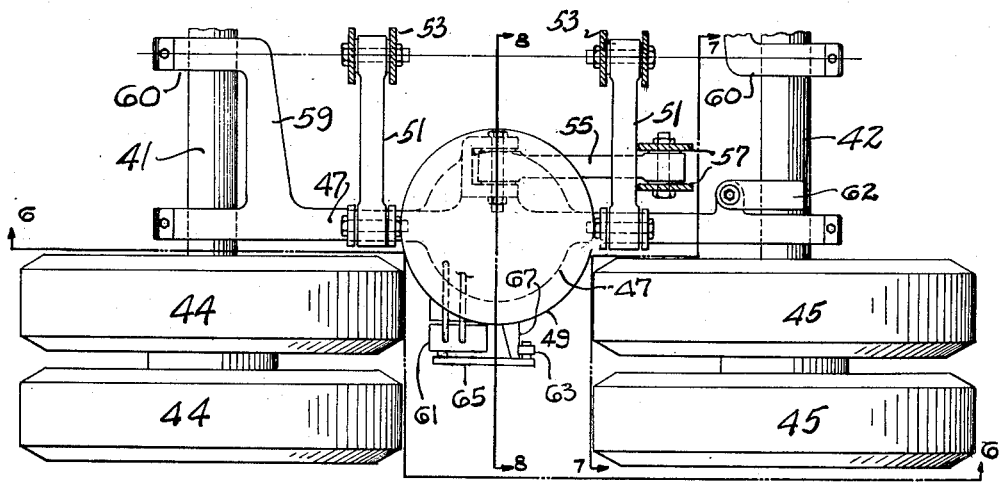

FIGURE 5 corresponds generally to FIGURE 1, but illustrates another form of the invention which does not include a transverse spring plank.

Figure 6:
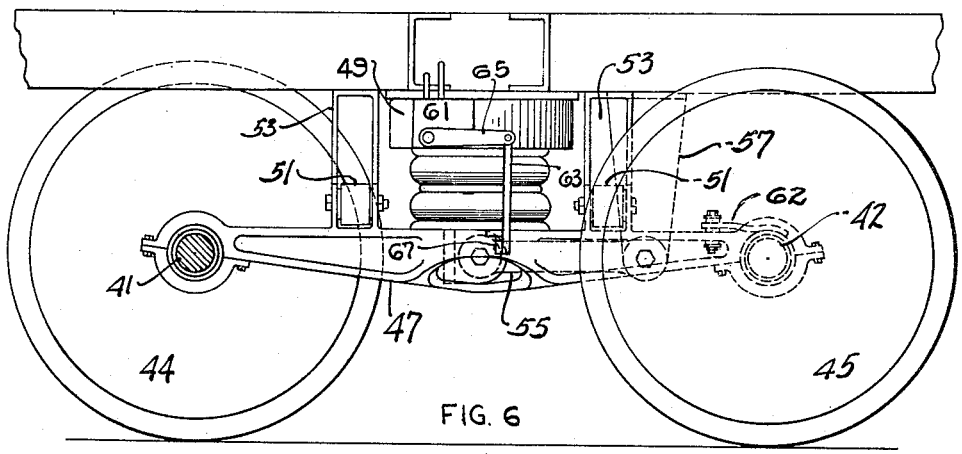

FIGURE 6 is a side view and longitudinal vertical section on line 6—6 of FIGURE 5.

Figure 7:
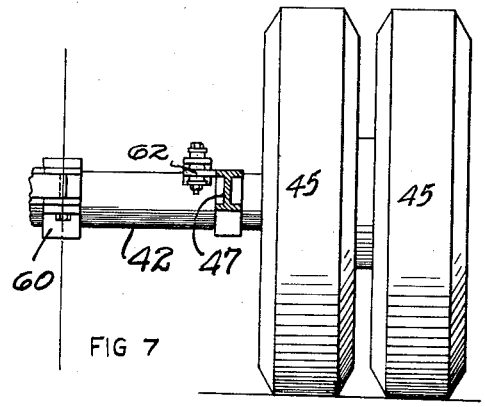

FIGURE 7 is a transverse vertical section on line 7—7 of FIGURE 5.

Figure 8:
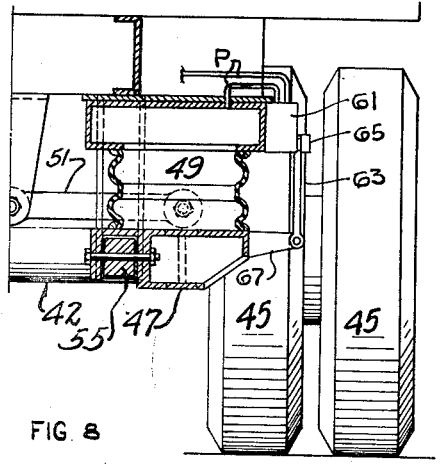

FIGURE 8 is a transverse vertical section on line 8—8 of FIGURE 5.

Non-rotating axles 1, 2 are mounted on dual wheels 4, 4 and 5, 5, respectively. An equalizer 6 at each side of the vehicle extends between axles 1, 2 inboard of wheels 4, 5. Each end of the equalizer terminates in an arcuate bearing 7 provided with an arcuate cap 8. The bearing and cap will be clamped about a rubber bushing 10 which may yield in shear circumferentially of the axle to accommodate tilting of the equalizer due to highway inequalities.

A spring plank 12 extends transversely of the vehicle and has depending webs 13, 14 straddling each equalizer 6 and seating a trunnion 16 mounted in the equalizer by a rubber bushing 18 surrounded by an arcuate bearing 20 on the equalizer and an arcuate cap 21 secured to the equalizer. Distortion of the rubber bushing in shear enables the equalizer to tilt vertically while the spring plank remains upright, thus accommodating unevenness in the roadway.

Spring plank 12 extends outboard of the equalizers and forms seats 23 for air springs, each comprising an upwardly-opening lower reservoir chamber 25, a downwardly-opening upper reservoir chamber 26, and a bellows 27 with its ends secured to chambers 25, 26 respectively. A source of air under pressure (not shown) is on the vehicle and an air passageway P leads therefrom to each air spring and an associated control valve 24 of a type known in the art (one example being described in Patent No. 2,670,201 issued February 23, 1954) whereby when, for any reason, the level of the vehicle body B supported on the spring is lowered from a predetermined height, a pitman 28, connecting the valve handle or crank 31 to spring plank 12, operates to open the valve and admit additional air to the spring, thereby causing the spring to expand and raise the body B to the predetermined height; when this height is reached the valve is returned to the closed position. When, for any reason, the level of the body exceeds the predetermined height, the valve discharges air from the spring thereby permitting the spring to contract and lower the body to the predetermined height. While the vehicle body is at the desired height the valve remains closed, neither admitting or exhausting air. Because of lateral clearance limitations, the vertical axis of each air spring is in the vertical longitudinal plane intermediate the dual wheels and outboard of the equalizers, but it will be understood that subject to clearance limitations even wider spacing of the springs would be desirable. This wide spacing of the springs and the automatic valving provides maximum lateral stability for the vehicle body, the sides of which rest upon the air springs and results in easy riding whether the vehicle is empty or heavily loaded.

A bracket 29 extends downwardly and transversely of the vehicle from one side of the body and then upwardly to the other side. A diagonal brace 30 at each side of the structure extends from the lower portion of bracket 29 to the body. An anchor 33 of wishbone shape has the ends of its legs pivoted to the lowermost parts of webs 13 on spring plank 12 and has its opposite end pivoted to the intermediate part of bracket 29. Upper anchors 37 at the sides of the structure are each connected at one end to the upper portion of bracket 29 and at the opposite end to upstanding webs 39 on spring plank 12. Anchors 33, 37 and the associated parts hold the spring plank and springs against tilting relative to the vehicle body lengthwise of the vehicle and also hold the spring plank, equalizers, axles and wheels against swiveling relative to the body.

The anchors do not interfere with relative vertical movement of the body and mounting structure due to the spring action.

For dissipating braking torque into the equalizers, each axle is provided at one end with a torque arm 40 secured to the adjacent equalizer 6 by a bolt or rubber sandwich. The torque arms are on diagonally opposite ends of the respective axles only, since a nearly rigid connection between both axles and each equalizer would result in the application of undesirable torsional stresses to the axles in response to irregularities in the roadway tending to tilt the equalizers relative to each other.

FIGURES 5–8 illustrate another form of the invention in which the axles 41, 42, wheels 44, 45 and equalizers 47 correspond to those previously described, but self-leveling air springs 49 are mounted directly upon equalizers 47 and the spring plank shown in the previous form of the invention is not used. A pair of longitudinally spaced, laterally extending anchors 51 each has one end connected to the equalizer 47 at one side of the vehicle and has its other end connected to bracket 53 depending from the vehicle body on the longitudinal center line of the vehicle. A longitudinally extending anchor 55 is associated with each equalizer 47 and is connected thereto at one end, the other end of the anchor being connected to a bracket 57 depending from the vehicle body. Each equalizer includes a laterally extending arm 59 at one end only, having an axle clamping jaw 60 at the end remote from the equalizer, whereby the equalizer is maintained substantially at right angles to the axle. The brackets 59, 60 are on diagonally opposite ends of the corresponding equalizers.

The air spring control valve 61 is actuated by a pitman 63 connected to the valve crank 65 and to a bracket 67 on the spring seat portion of equalizer 47.

With this construction, the axles are held against movement relative to the vehicle body except in a vertical direction due to the action of springs 49. It will be understood that the connections between the equalizers and the axles are rubber bushed as previously described, and that each axle is provided at one end with a single torque arm 62 for resisting braking torque.

This structure is of lighter weight than that previously described but retains the advantages of an equalized tandem axle structure with self-leveling air spring support of the vehicle body affording a high degree of lateral stability.

The structural features of the invention may be varied otherwise than as shown without departing from the spirit of the invention and the exclusive use of those modifications coming within the scope of the claims is contemplated.

What is claimed is:

1. A vehicle body mounting structure comprising spaced axles, each extending from side to side of the structure, with wheels upon their opposite ends, equalizers extending between the axles and mounted thereon to incline vertically relative to each other lengthwise of the structure, a spring seat member on each equalizer and having a horizontal trunnion bearing on the equalizer extending transversely of the equalizer intermediate the ends of the latter, an upstanding body-supporting spring on each seat member, and vertically spaced elongated anchors at each side of the structure extending substantially parallel and horizontally and each pivotally secured at one end to one of said seat members and provided at its other end with elements for pivotal attachment to a vehicle body supported on said springs, said anchors maintaining the relation between the wheeled axles and the spring seats lengthwise of the truck and maintaining the spring seats against rotation about said trunnions but accommodating vertical movement of the wheeled axles and equalizers relative to a vehicle body supported on the springs, and a bar nonrotatably secured to each axle and extending therefrom with its outer end secured to an equalizer to resist wheel brake torque forces independently of the body supporting spring.

2. A vehicle body mounting structure comprising spaced axles with wheels, equalizers extending between the axles and being tiltable vertically relative to each other about the axles, spring seats mounted on the equalizers between their ends to tilt lengthwise of the equalizers, vertically-yielding, body-supporting upright springs mounted on said seats, elongated anchors each having a pivotal connection at one end to one of said equalizers and extending therefrom transversely of the equalizer, said anchors having elements at their outer ends for pivotal connection to a vehicle body mounted on the springs, and elongated anchors each having a pivotal connection at one end to one of said equalizers and extending therefrom transversely of said axles and having an element at its outer end for pivotal connection to a vehicle body, said anchors being disposed one above the other and holding the equalizers and the springs mounted thereon against horizontal movement relative to the vehicle body mounted on said springs but accommodating relative vertical movement of the equalizers and vehicle body, and a brake torque resisting member secured to each axle and extending therefrom with its outer end connected to an equalizer.

3. A vehicle body mounting structure comprising spaced axles with wheels journaled on the ends thereof, equalizers extending between the axles inboard of the wheels and mounted on the axles, the intermediate portion of each equalizer being widened to form an integral spring seat, an upright spring carried on each seat and arranged to support a vehicle body at its upper end, an elongated anchor secured at one end to each equalizer adjacent to the spring seat and extending therefrom lengthwise of the equalizer, an elongated anchor secured at one end to one equalizer adjacent to the spring seat and extending therefrom inboard of the equalizer, each having elements at its end remote from its securing to the equalizer arranged for attachment to a vehicle body mounted on the springs, whereby said anchors hold the axles and wheels against horizontal movement relative to a body carried on the structure but accommodating relative vertical movement of the equalizers and vehicle body, and a brake torque resisting member secured to each axle and extending therefrom with its outer end connected to an equalizer.

4. A vehicle body mounting structure comprising spaced axles with wheels journaled on the ends thereof, equalizers extending between the axles inboard of the wheels and mounted on the axles, the intermediate portion of each equalizer being widened to form an integral spring seat, an upright spring carried on each seat and arranged to support a vehicle body at its upper end, an elongated anchor adjacent to each spring seat and extending therefrom lengthwise of the equalizer, elongated anchors extending transversely of the structure at opposite sides of one of the spring seats, each anchor having elements at one end pivoted to an equalizer member and having elements at its other end for pivotal attachment to a vehicle body mounted on the springs whereby said equalizers and anchors hold the axles and wheels against horizontal movement relative to a body carried on the structure and maintaining the axles at right angles to the length of the vehicle body but accommodating relative vertical movement of the equalizers and vehicle body, and a brake torque resisting member secured to each axle and extending therefrom with its outer end connected to an equalizer.

5. A vehicle body mounting comprising spaced axles with wheels mounted on their opposite ends, equalizers extending between the axles with the ends of the equalizers supported from the axles to tilt vertically independently of each other, a spring plank extending between said equalizers parallel to the axles and intermediate the ends of the axles and over the equalizers and having depending portions pivoted on the equalizers to tilt vertically, spring seats supported on the end portions of said spring plank, body mounting upstanding springs carried on said spring seats, parallel bar anchorage means extending transversely of the spring plank from points on the latter above and below the level of the spring seats, elements at the outer ends of said anchorage means for pivotal connection to a vehicle body, and a brake torque resisting member secured to each axle and extending therefrom with its outer end connected to an equalizer.

6. A vehicle body mounting comprising spaced axles with wheels mounted upon their opposite ends, equalizers extending between the axles with the ends of the equalizers mounted on the axles, the equalizers being tiltable vertically relative to each other about the axles, spring seating structure supported from the equalizers intermediate the ends of the latter, upstanding body-supporting springs on said seating structure, anchor means holding said axles and equalizers against shifting lengthwise of a body mounted on said springs but accommodating vertical movement of the wheeled axles and equalizers relative to a vehicle body mounted on the springs, and a torque arm secured to each axle and extending therefrom toward the seating structure with its extended end connected to an equalizer to resist wheel brake torque independently of said springs.

7. A vehicle body mounting structure according to claim 6 in which each equalizer member is mounted on the end portions of the axles and includes an arm at one end extending parallel to the adjacent axle and secured thereto near the middle of the axle to hold the equalizer member and axle in predetermined angular relation.

8. A vehicle body mounting structure according to claim 6 in which the elongated anchors include one anchor associated with each equalizer member and extending substantially parallel thereto, and two anchors associated with one equalizer member only and extending substantially transversely thereof and spaced apart and spaced inwardly from the ends of the equalizer member.

9. A vehicle body mounting structure according to claim 6 which includes dual wheels spaced apart at each end of each axle, the equalizers extending between said axles inboard of the inner wheel of each pair of dual wheels, and the upright axes of the spring seats and springs being positioned in the vertical planes extending lengthwise of the structure between the wheels of each pair of wheels.

References Cited in the file of this patent

UNITED STATES PATENTS

| | | |
|---|---|---|
| 1,692,891 | Fageol | Nov. 27, 1928 |
| 1,842,074 | Davis | Jan. 19, 1932 |
| 1,845,854 | Tapp | Feb. 16, 1932 |
| 1,913,698 | Clement | June 13, 1933 |
| 1,946,060 | Buckendale | Feb. 6, 1934 |
| 2,091,406 | Judd | Aug. 31, 1937 |
| 2,103,381 | Perkins | Dec. 28, 1937 |
| 2,176,172 | Flowers | Oct. 17, 1939 |
| 2,456,719 | Martin | Dec. 21, 1948 |
| 2,493,004 | Mackie | Jan. 3, 1950 |
| 2,520,777 | Page | Aug. 29, 1950 |
| 2,691,420 | Fox | Oct. 12, 1954 |
| 2,771,303 | Frazier | Nov. 20, 1956 |